(No Model.) 3 Sheets—Sheet 1.

R. J. & J. T. STORY, A. E. FOX & G. J. HILL.
REGISTERING ATTACHMENT FOR TELEPHONES.

No. 428,427. Patented May 20, 1890.

Witnesses.
J. G. Johnson
Robert A. Geary

Inventors.
Robert J. Story.
John T. Story.
Albert E. Fox.
George J. Hill.
By James Sangster, Attorney (No Model.) 3 Sheets—Sheet 2.
R. J. & J. T. STORY, A. E. FOX & G. J. HILL.
REGISTERING ATTACHMENT FOR TELEPHONES.
No. 428,427. Patented May 20, 1890.
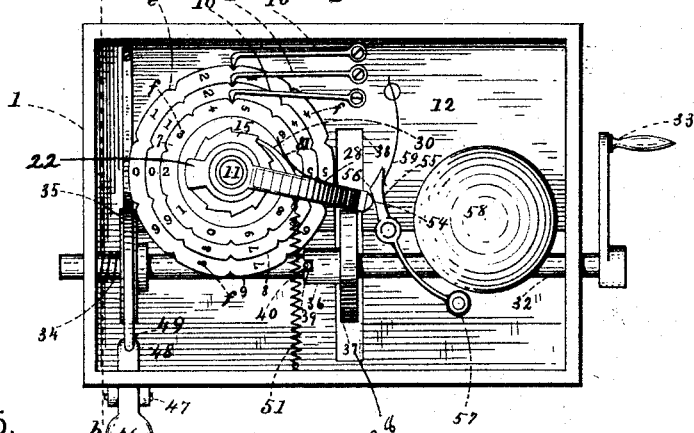
Witnesses.
J. F. Johnson
Robert A. Geary
Inventors.
Robert J. Story.
John T. Story.
Albert E. Fox.
George J. Hill.
By James Sangster
Attorney.

(No Model.) 3 Sheets—Sheet 3.

R. J. & J. T. STORY, A. E. FOX & G. J. HILL.
REGISTERING ATTACHMENT FOR TELEPHONES.

No. 428,427. Patented May 20, 1890.

Witnesses.
J. G. Johnson
Robert A. Geary

Inventors.
Robert J. Story
John T. Story
Albert E. Fox
George J. Hill
By James Sangster
Attorney.

UNITED STATES PATENT OFFICE.

ROBERT J. STORY, JOHN T. STORY, ALBERT E. FOX, AND GEORGE J. HILL, OF BUFFALO, NEW YORK, ASSIGNORS OF ONE-FIFTH TO GEORGE F. FOX, JR., OF SAME PLACE.

REGISTERING ATTACHMENT FOR TELEPHONES.

SPECIFICATION forming part of Letters Patent No. 428,427, dated May 20, 1890.

Application filed August 14, 1889. Serial No. 320,733. (No model.)

*To all whom it may concern:*

Be it known that we, ROBERT J. STORY, JOHN T. STORY, ALBERT E. FOX, and GEORGE J. HILL, all citizens of the United States, residing in Buffalo, in the county of Erie and State of New York, have invented certain new and useful Improvements in Registering Attachments for Telephones, of which the following is a specification.

Our invention consists in the combination, with a telephone, of a registering device for keeping a record of the number of times a telephone has been used, and will be fully and clearly hereinafter described and claimed, reference being had to the accompanying drawings, in which—

Figure 1:
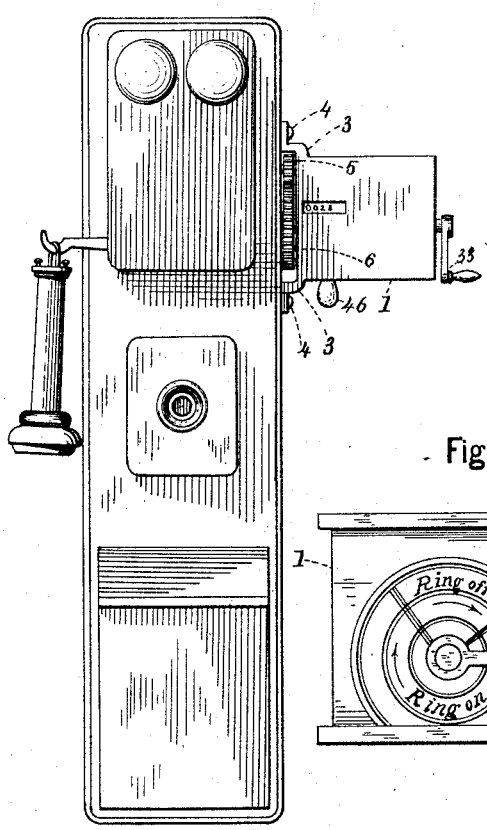
Figure 2:
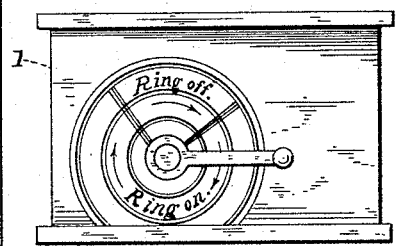
Figure 3:
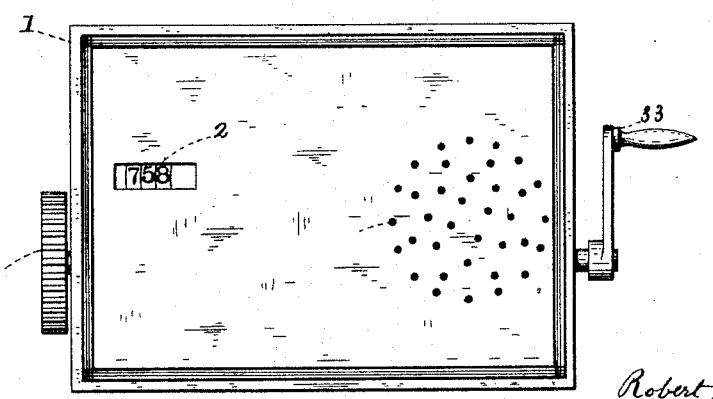
Figure 10:
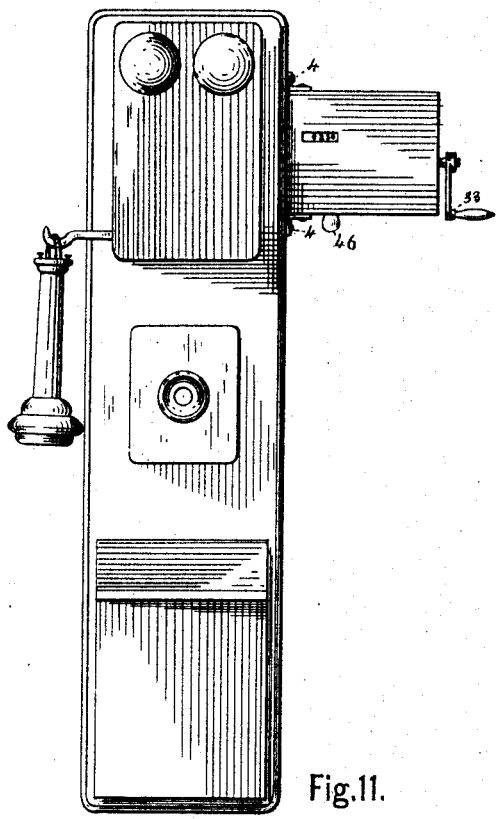
Figure 11:
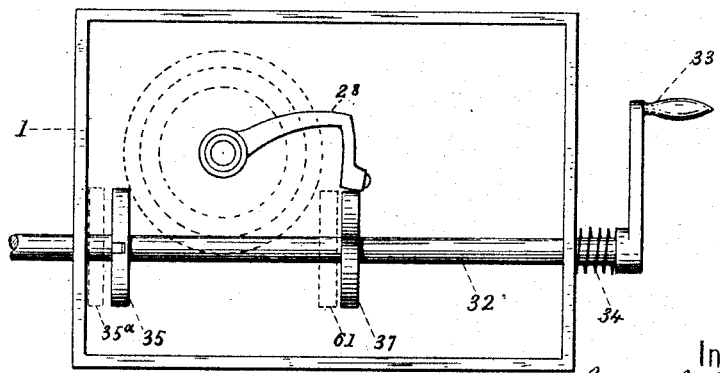

Figure 1 is a front elevation of a telephone, showing our invention connected therewith. Fig. 2 is an end elevation of the registering device. Fig. 3 is a front elevation. Fig. 4 represents a front elevation, the front side being removed, so as to show the mechanism inside. Fig. 5 is a cross-section on line $a\,b$, Fig. 4. Fig. 6 is an enlarged detached side elevation of the registering-wheel and a portion of its operating mechanism. Fig. 7 is a sectional elevation showing the interior construction of the numbering-wheel, the section being taken on or about line $c\,d$, Fig. 8, cutting through the three disks of the wheel only. Fig. 8 is an enlarged top view of the wheel. Fig. 9 is a section through the locking-wheel. Fig. 10 is a front elevation showing a modification. Fig. 11 is a front elevation of the device, the cover being removed, also showing a modification.

The case or box 1 for holding the registering mechanism may be made of either wood, iron, or other suitable material. It is provided with an opening 2, through which the registering figures may be seen. At each side of the case 1 is a lug or projecting piece 3, by which the case is secured to the telephone by bolts or screws 4. These lugs project sufficiently far beyond the case to allow room enough between the telephone and case for the pinion 5, which is attached to the telephone-shaft that operates the ringing or calling mechanism, and also for the spur-wheel 6, which gears into the pinion 5 and is attached to the shaft for operating the registering mechanism, the construction being such that one turn of the registering mechanism shaft will make two, three, or more turns of the telephone-shaft while ringing for a call or ringing off. The numbering or registering mechanism is composed in this instance of three disks 7 8 9; (but more or less than that number of disks may be used, if desired.) Each disk is provided with ten notches $e$ and a spring-pawl 10, which springs into one of the notches $e$ on each disk and holds it in position until moved therefrom by sufficient force to move a notch away from under the ends of a pawl, and thereby allow it to be caught and held by another notch until moved therefrom in a similar manner. It will be noticed that the top disk is the smallest, and they gradually increase in size, the bottom disk being the largest. The object of this construction is to permit the figures $f$ to be placed on the side of the disk instead of placing them upon the edge of the disk, as usually done heretofore. These disks 7 8 9 are mounted on a horizontal shaft 11, one end of which is rigidly secured to the plate or supporting-piece 12 by a nut 13, so that each disk turns easily on said shaft. In the second and third disk is a series of ten holes 14, (see Fig. 8,) in which the holes 14 are shown by dotted lines, as they are all below the upper disk. On the top of the upper disk 7 is a ratchet-wheel 15, rigidly secured to it so as to turn with it, and through the ratchet-wheel and partly through the disk is a hole 16, passing down through the ratchet-wheel 15 and into the disk 7, and then, being reduced in size at $i$, passes through the disk. (See Fig. 7, where these parts are shown in section.) In this perforation 16 is placed a pin 17, having an enlarged head 18, (shown in Figs. 6 and 8,) the smaller portion passing down into and through the reduced portion $i$ of the hole 16, which corresponds in size to the holes 14 in the lower disks 8 and 9. The head 18 is provided with a thin surrounding-flange 19, and at the top of the hole 16 is an inwardly-projecting flange 20. The spiral spring 21 presses against the under side of the flange 19, (shown in Fig. 7,) so that when the pin 17 is in its normal position it is forced upward by the spring 21 until the top of the flange 19 rests up against the flange 20 and the upper portion of the head 18 projects up out of the hole 16 a short distance above the ratchet-wheel. (See Fig. 6, in which the head 18 of the pin 17 is shown in its normal position.) On the top of the ratchet-wheel 15 is a cam 22, rigidly secured to the shaft 11, so that it remains stationary while the disk and ratchet-wheel 15 are turning on said shaft. It will be noticed that the head 18 is beveled off on one side, so as to allow it to pass easily under the beveled side 23 of the cam 22 as the ratchet-wheel is turned around on the shaft 11. In the disk 8 is a pin 24, secured to or forming a part of a flat spring 25, which is secured in a slot or groove 26 in the disk by a screw 27. (See Fig. 7.) The spring 25 is for the purpose of keeping the pin 24 up in its normal position within the disk 8 and out of the disk 9 until forced down by the pin 17, when its head 18 passes under the inclined or beveled portion 23 of the cam 22 as the ratchet is turned while operating the device. From this construction it will be seen that the ratchet-wheel 15 has to be moved one step each time (ten times) before it moves the disk 7 one complete revolution, and that each time it does make a revolution the pin 17, as its beveled head 18 passes under the beveled or inclined portion 23 of the cam 22 and pushes the pin down, engages with a hole 14 in the disk 8, thereby moving the disk 8 one step forward. (The pin is released from the disk 8 as soon as its head 18 passes from under the cam 22 and springs up out of it.) This operation continues until the disk 8 is turned so that its hole 14 (containing the pin 24) is in position for said pin to be forced down into a hole 14 in the disk 9 by the cam 22 and pin 17, when the disk 9 moves a step forward until released by the head of the pin 17, passing from under the cam 22.

Above the cam 22 is mounted loosely on the shaft 11 a curved arm 28, (see Figs. 4 and 6,) having a friction-roller 29. To the arm 28 is pivoted a pawl 30, which engages with the ratchet-wheel 15. It is kept up to the ratchet-wheel by a spring 31.

Longitudinally within the case or box 1 is mounted a shaft 32, having a crank 33, for operating it. It is capable of a slight longitudinal movement back and forth and a spiral spring 34, interposed between the inside of the case 1 and the locking and unlocking wheel 35, keeps the shaft back in its normal position. On the shaft 32 is mounted loosely a sleeve 36, having a cam 37 rigidly secured to it. The cam 37 and sleeve 36, to which it is attached, are prevented from slipping longitudinally either way by a slot 38, into which the former projects. (See Fig. 4.) At the outer end of the sleeve 36 is a square notch 39, into which the pin 40, which is rigidly secured to the shaft 32, passes when the shaft is in its normal position. The object of this construction is to either release or bring the cam 37 into action when required.

To release the shaft 32 from the cam, all that is necessary to do is to force the crank-arm and the shaft 32 forward longitudinally, so as to compress the spring 34 and carry the pin 40 out of the notch 39. In this position the shaft is free and may be turned any number of times and used for ringing on a call. By releasing the crank-handle and allowing the spring 34 to act the shaft is forced back toward its normal position, and if the pin is opposite the notch 40 it is forced into it, thereby holding the cam securely to the shaft, so that it turns with it unless otherwise stopped. If the pin 40 is not just in the position to engage with the notch 39, a turn of the crank-shaft will soon bring it into position. The locking and unlocking wheel 35 is provided with two notches 41 and 42, (see Fig. 5,) and 43 represents a spring secured by a screw 44 to the supporting-plate 12. This spring 43 turns up and bends over the periphery of the locking-wheel, and is provided with a downwardly-projecting piece 45, adapted to catch into the notches 41 and 42 and stop the wheel 35, when required. To release the stop-wheel 35, a thumb-piece 46 is pivoted to the side of the case by a pin 47. (Shown in Figs. 4 and 5.) The portion 48 on the inside of the case forming a part of this thumb-piece projects under the end 49 of the spring 43, so that a pressure downward on the thumb-piece will lift that end of the spring and the portion 45 out of the notch 41 or 42, and thereby release the wheel and consequently the shaft 32.

The notches 41 and 42 do not extend entirely across the face of the locking-wheel. On the inner side of the locking-wheel these notches are closed, the closed side having an incline, as shown at 42 and 50 in Fig. 9, so that as the wheel is pushed under the pin 45 said pin is raised up out of the notch by the inclined portion passing under it, thereby releasing the wheel, so that the shaft 32 may be turned when ringing on for a call.

The operation of the device is as follows: When it is desired to make a call, the crank-handle 33 is pushed in, thus releasing the locking-wheel and shaft, as above mentioned. It can now be turned sufficiently to ring the bell and make a call at the main office. After a call has been made the lateral pressure on the handle 33 is released, thereby allowing the shaft to resume its normal position and the shaft and locking-wheel to become locked. The telephone having been used and it is desired to register and ring off, the thumb-piece 46 is pressed down, so as to release the locking-wheel, as above mentioned, by lifting the portion 45 out of the notch 41. By now turning the crank until it is stopped by the notch 42 the cam 37 passes the roller 29, and in passing pushes the arm 28, which turns on the shaft 11, and is kept to its place thereon by a collar 52, secured to said shaft by a set-screw 53, (see Fig. 6,) and carries the pawl 30 forward, thereby causing the numbering-wheel to register, as heretofore described. At the same time the end 54 of the arm 28 (see Fig. 4) in passing the pivoted arm 55 causes it to turn, and when the end 54 passes the point 56 the spring 59 acting throws it back with sufficient force to cause the hammer 57 to strike the bell 58 and ring an alarm. When the cam turns by or past the friction-roller 29, the arm 28 is brought back to its normal position by the spring 51. (Shown in Fig. 4.)

We do not confine ourselves to the exact registering mechanism shown and described, as any well-known numbering apparatus may be used.

The shaft 32 may be connected to the telephone signal-shaft in any well-known way, or the shaft 32 and the signal-shaft may be made in one piece, so that the two will operate together.

In Fig. 10 we have shown a modification of the device, in which the gear-wheels 5 and 6 are dispensed with and the shaft 32 is connected directly with the telephone signal-shaft or forms a portion of it.

In Fig. 11 we have shown a modified construction of the mechanism for operating the numbering-wheel, in which the sleeve 36 is dispensed with and the cam 37 is rigidly secured to the shaft 32, the construction being such that a movement of the shaft 32 longitudinally against the force of the spring 34 (which in this case is located outside of the case between the handle 33 and the side of the case) will bring the cam 37 into the position shown by the dotted lines 61 in said Fig. 11. The arm 28, as will be noticed, is made in an angular form, so as to allow the longest portion of the cam 37, while in the position of the dotted lines 61, to pass by it without operating the arm 28. The object of the notch 41 in the wheel 35 is to lock the shaft 32 after a call has been given, from which it cannot be unlocked until a pressure is put on the thumb-piece 46, as above mentioned, and the object of the notch 42 in said wheel is to lock the shaft 32 after the registering mechanism has been operated. This construction prevents any accidental operation of the registering device.

We claim as our invention—

1. The combination, with the signal-shaft of a telephone-box, of a registering apparatus, a cam to vibrate a pawl-arm, a sleeve rigidly secured to such cam, having a notch at one end, a shaft within said sleeve having a detent to catch in said notch and connected with the telephone signal-shaft, and mechanism for making the sleeve-carrying shaft longitudinally adjustable, so as turn with or without the sleeve and cam, substantially as described.

2. In a telephone registering device, the combination of a shaft 32, a cam secured to said shaft, a numbering-wheel-operating arm, against which the cam acts while operating the numbering mechanism, a locking-wheel provided with a spring-detent, and thumb-piece for locking or unlocking the shaft, substantially as described.

3. The combination, with a telephone, of a registering apparatus consisting of a case or holder provided with an opening exposing the registering number and secured to the telephone, a suitable numbering mechanism, a pawl and ratchet for operating it, a cam provided with a sleeve having a notch 39 and mounted on a longitudinally-movable shaft 32, provided with an engaging or disengaging pin 40, for ringing a telephone call-bell, and a handle on the shaft 32, for giving the shaft a longitudinal movement to release it from the locking mechanism and for turning it to ring on a call, substantially as described.

4. In a telephone signal and registering apparatus, the combination of a case for holding the numbering mechanism, a shaft mounted in bearings in said case and capable of a slight longitudinal movement, a spring for keeping it in its normal position, a cam attached to a sleeve, a clutching mechanism between the sleeve and shaft, and a means for disconnecting the shaft from the cam and numbering mechanism, whereby a telephone call-bell may be operated at the general office without moving the cam or operating the registering apparatus, substantially as described.

5. In a telephone registering apparatus, the combination, with the numbering mechanism, of a pawl-arm for operating the same, having a projecting end portion 54, and a bell mounted within the case and provided with a hammer mounted on a pivoted handle kept in its normal position by a spring and provided with a projecting portion 56, whereby a signal may be sounded for ringing off at the close of a message, substantially as described.

6. In a telephone registering apparatus, the combination, with a shaft 32, mounted in bearings in the inclosing-case, of a locking and unlocking device consisting of the wheel 35, rigidly attached to the shaft and provided with notches 41 42, a spring having a projecting piece 45, for catching into said notches, and a pivoted thumb-piece for lifting the portion 45 out of a locking-notch, and thereby releasing the shaft 32, so that at the close of a message a ring-off signal may be given and the register operated, substantially as described.

7. In a telephone registering apparatus, the combination of a numbering device and its operating mechanism inclosed in a case attached to the telephone, a shaft 32, connected with the telephone signal apparatus mounted in bearings within the case, having a longitudinal movement and kept in its normal position by a spring, a cam secured to a sleeve provided with a notch and mounted loosely on said shaft for operating the pawl-arm and numbering-wheel, a pin on the shaft for engaging with the notch in the sleeve for locking it and the cam to the shaft when in its normal position and disengaging it when forced out of its normal position, and a locking-wheel secured rigidly to the shaft and provided with notches extending partly across the face of the wheel and ending in an incline 50, whereby a longitudinal movement of the shaft against the force of the spring 34 releases the shaft from both the cam and the locking-wheel, so that it may be turned freely, for the purposes described.

ROBERT J. STORY.
    JOHN T. STORY.
    ALBERT E. FOX.
    GEO. J. HILL.

Witnesses:
 ROBERT A. GEARY,
 JAMES SANGSTER.